US010387233B2

(12) United States Patent
Kinjo et al.

(10) Patent No.: US 10,387,233 B2
(45) Date of Patent: Aug. 20, 2019

(54) INFORMATION PROCESSING DEVICE AND METHOD OF TESTING

(71) Applicant: FUJITSU LIMITED, Kawasaki-shi, Kanagawa (JP)

(72) Inventors: Tsukasa Kinjo, Edogawa (JP); Satoshi Kubota, Yokohama (JP); Junichi Ogawa, Tachikawa (JP)

(73) Assignee: FUJITSU LIMITED, Kawasaki (JP)

( * ) Notice: Subject to any disclaimer, the term of this patent is extended or adjusted under 35 U.S.C. 154(b) by 178 days.

(21) Appl. No.: 15/608,086

(22) Filed: May 30, 2017

(65) Prior Publication Data

US 2018/0011756 A1 Jan. 11, 2018

(30) Foreign Application Priority Data

Jul. 8, 2016 (JP) .................................. 2016-136043

(51) Int. Cl.
*G06F 11/07* (2006.01)
*G06F 11/30* (2006.01)

(52) U.S. Cl.
CPC ........ *G06F 11/0745* (2013.01); *G06F 11/076* (2013.01); *G06F 11/079* (2013.01); *G06F 11/3041* (2013.01)

(58) Field of Classification Search
CPC ... G06F 11/0745; G06F 11/076; G06F 11/079
See application file for complete search history.

(56) References Cited

U.S. PATENT DOCUMENTS

| 7,320,084 | B2 * | 1/2008 | Steinmetz | ........... G06F 11/0727 370/216 |
| 7,673,185 | B2 * | 3/2010 | Kalwitz | ............... G06F 11/0727 714/4.1 |
| 7,835,288 | B2 * | 11/2010 | Cantwell | .................. H04L 43/18 370/241 |
| 8,527,815 | B2 * | 9/2013 | Whitt | ..................... G06F 11/079 714/25 |
| 8,812,913 | B2 * | 8/2014 | Colline | ............... G06F 11/0727 714/43 |
| 2006/0061369 | A1 * | 3/2006 | Marks | .................... G06F 11/221 324/542 |
| 2011/0283150 | A1 | 11/2011 | Konishi et al. | |
| 2016/0092292 | A1 * | 3/2016 | Lv | ......................... G06F 11/079 714/37 |

FOREIGN PATENT DOCUMENTS

JP 2013-515981 5/2013

* cited by examiner

*Primary Examiner* — Joseph R Kudirka
(74) *Attorney, Agent, or Firm* — Staas & Halsey LLP

(57) ABSTRACT

An information processing device includes a first port and a processor coupled to the first port and configured to transmit, via the first port, a first signal to a first device coupled to the first port, cause a second device coupled to the first port to determine whether a failure is present in the first port when the information processing device does not receive a first response signal in response to the first signal, and determine that the failure is present in the first device when the second device does not determine that the failure is present in the first port.

16 Claims, 12 Drawing Sheets

INFORMATION PROCESSING DEVICE AND METHOD OF TESTING

CROSS-REFERENCE TO RELATED APPLICATION

This application is based upon and claims the benefit of priority of the prior Japanese Patent Application No. 2016-136043, filed on Jul. 8, 2016, the entire contents of which are incorporated herein by reference.

FIELD

The embodiments discussed herein are related to an information processing device and a method of testing.

BACKGROUND

A computer has a coupling port for coupling devices such as a memory device, an arithmetic device, an output device. In a case of coupling a plurality of these coupling devices, an expansion device on which a plurality of coupling ports are mounted is used. For example, the expansion device functions as a coupling control device that couples the coupling devices coupled to a selected coupling port and the computer.

As an example, in a storage device, an expansion device called an expander (EXP) is used for coupling a plurality of memory devices such as a plurality of hard disk drives (HDD) and redundant arrays of inexpensive disks (RAID) devices.

The EXP has a plurality of physical ports (PHY) as the coupling ports. The PHY has a serial parallel conversion circuit such as a serializer/deserializer (SerDes). The EXP couples the memory devices that are access destinations and a controller module (CM) which controls the input and output to and from the memory device by switching a path between the CM and the PHY.

As described above, in a case where the computer and the coupling devices are coupled via the expansion device, and when an error occurs at the time of access to the coupling devices, a work for specifying whether a source of error is the expansion device or the coupling device is performed.

In a case of the storage device described above, as a method of specifying the source of error, a loopback diagnosis is used, in which a data frame is transmitted from the CM to the memory device that is the access destination, and then, the source of error is specified referring to the response to the data frame. In addition, a diagnosis method is proposed, in which a connection frame (a frame used for establishing connections between devices) is transmitted to the device from which the fault is detected by the loopback diagnosis and fault information included in the response to the connection frame is investigated. Japanese National Publication of International Patent Application No. 2013-515981 is a sample of the background art literature.

SUMMARY

According to an aspect of the invention, an information processing device includes a first port and a processor coupled to the first port and configured to transmit, via the first port, a first signal to a first device coupled to the first port, cause a second device coupled to the first port to determine whether a failure is present in the first port when the information processing device does not receive a first response signal in response to the first signal, and determine that the failure is present in the first device when the second device does not determine that the failure is present in the first port.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The expansion device interprets the frame transmitted toward the coupling device that is the access destination from the computer, and selects a coupling port to which the coupling device is coupled which is the destination of the frame, and then, transfers the frame. The coupling device receives the transferred frame and interprets the received frame, and then, performs processing such as a response. Therefore, in the expansion device or the coupling device, if there is a failure in a logic circuit that interprets the frame, no response is returned to the computer.

In the expansion device and the coupling device on which an error counter is mounted, if the logic circuit is normal, it is possible to detect a bit error using the cyclic redundancy check (CRC) or the like included in the received frame. Therefore, by counting the number of times of detecting the bit error or the number of re-frames using the error counter, it is possible to detect the occurrence of the error from the number of counts caused by the deterioration of the transmission quality.

However, any of the error detection methods using the diagnosis method in the storage device described above and using the error counter described above is useful under the assumption that the logic circuit can normally interpret the frames. Therefore, even if those methods are applied as they are, in a case where there is no response to the frame, it is difficult to specify the source of error. Therefore, the inventors studied a new mechanism for specifying the source of error caused by the malfunction of the function of interpreting the frame such as a failure in the logic circuit.

Hereinafter, embodiments will be described referring to the attached drawings. In the present specification and the drawings, in some cases, the same signs will be given to the elements actually having the same functions and the description thereof will be omitted.

<1. First Embodiment>

A first embodiment will be described referring to FIG. 1.

The first embodiment relates to a technology for specifying a failure location on a frame transmission path, and enables the specification of the failure location in a case where a failure occurs in a logic circuit that interprets the frame. FIG. 1 is a diagram illustrating an example of a control system in the first embodiment. A control system 1 illustrated in FIG. 1 is an example of a control system in the first embodiment. A storage device in which a CM and the memory devices are coupled via an EXP is an example of the control system 1.

Figure 1:
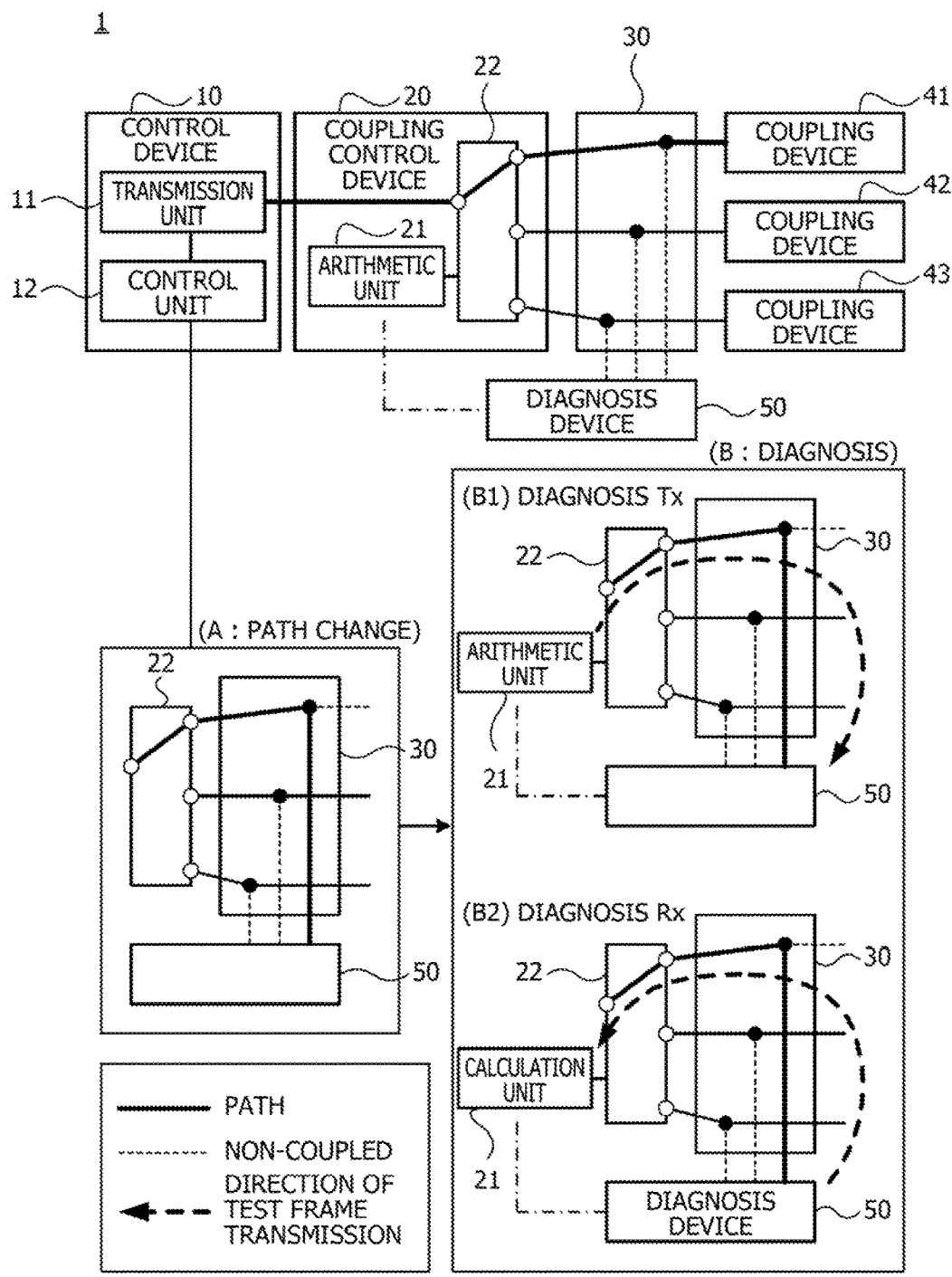
FIG. 1 is a diagram illustrating an example of a control system in a first embodiment.

As illustrated in FIG. 1, the control system 1 includes a control device 10, a coupling control device 20, a switch 30, coupling devices 41, 42 and 43, and a diagnosis device 50. The control device 10 includes a transmission unit 11 and a control unit 12. The coupling control device 20 includes an arithmetic unit 21 and a switching unit 22.

The control unit 12, the arithmetic unit 21, and the diagnosis device 50 are processors such as a central processing unit (CPU), a digital signal processor (DSP), an application specific integrated circuit (ASIC), or a field programmable gate array (FPGA). The control device 10, the coupling control device 20, and the diagnosis device 50 may include memories (not illustrated) such as random access memory (RAM) and a flash memory. The control unit 12, the arithmetic unit 21, and the diagnosis device 50 execute programs stored in the memories.

The CM is an example of the control device 10. An input output interface (hereafter, referred to as an input output controller (IOC)) of the CM that provides a function of transmission and reception of the frame is an example of the transmission unit 11. The EXP is an example of the coupling control device 20. The memory devices such as the HDD and the RAID devices are examples of the coupling devices 41, 42, and 43 respectively. In a case of a cascade configuration in which a plurality of EXPs are coupled in multi-stage, the EXPs are samples of the coupling devices 41, 42, and 43 respectively.

The arithmetic unit 21 of the coupling control device 20 controls the switching unit 22 that switches the transmission path, and switches a plurality of transmission paths reaching a plurality of coupling devices 41, 42, and 43. The transmission unit 11 transmits a frame for establishing the connection to the coupling device 41 that is the access destination among the plurality of coupling devices 41, 42, and 43, to the coupling control device 20.

In a case where the transmission path from the control device 10 to the coupling devices 41, 42, and 43 is a serial attached small computer system interface (SAS) coupling, the transmission unit 11 transmits, for example, an open address frame (OAF) to the coupling control device 20.

The arithmetic unit 21 controls an operation of the diagnosis device 50 that diagnoses a presence or absence of a failure in the designated transmission path among the plurality of transmission paths between the coupling control device 20 and the coupling devices 41, 42, and 43. In addition, the control unit 12 controls the arithmetic unit 21 and controls the operation of the diagnosis device 50 via the arithmetic unit 21.

For example, when a response to the frame transmitted by the transmission unit 11 is not received in time (timeout), the control unit 12 controls the arithmetic unit 21, and designates the transmission path of the frame and causes the diagnosis device 50 to diagnose the presence or absence of the failure. In addition, the control unit 12 determines whether the failure is present in the coupling control device 20 or the failure is present in the coupling device in the transmission path of the frame according to a result of the diagnosis.

In the example in FIG. 1, the transmission destination of the frame is set on the coupling device 41. In this case, the diagnosis device 50 diagnoses the presence or absence of the failure in the transmission path reaching the coupling device 41 between the coupling control device 20 and the coupling device 41. That is, the diagnosis device 50 diagnoses whether or not the failure is present in the preceding stage of the coupling device 41 seen from the control device 10.

In a case where the failure is detected in the transmission path to the diagnosis target, the control unit 12 determines that the failure is present in the coupling control device 20. On the other hand, in a case where the failure is not detected in the transmission path to the diagnosis target, the control unit 12 determines that the failure is present in the coupling device 41. By applying this determination method, even when the coupling device 41 does not return the response to the frame, it is possible to determine the failure location. Therefore, the failure location can be specified with respect to the failure in the logic circuit.

In order to cause the diagnosis device 50 to perform the diagnosis between the coupling control device 20 and the coupling devices 41, 42, and 43, a switch 30 for switching the transmission path may be provided as illustrated in FIG. 1. In this case, the arithmetic unit 21 of the coupling control device 20 can control the switch 30, and can switch at least one transmission path among the plurality of transmission paths to an alternate path reaching to the diagnosis device 50.

For example, when the response to the frame is not received in time, the control unit 12 controls the arithmetic unit 21 to switch the frame transmission path to the alternate path (A: path change in FIG. 1). The control unit 12 controls the arithmetic unit 21 and causes the diagnosis device 50 to diagnose the presence or absence of the failure based on the presence or absence of an error in the alternate path (B: diagnosis in FIG. 1).

The method of diagnosing the presence or absence of the failure is arbitrary. For example, the arithmetic unit 21 transmits a test frame in which processing according to a content is performed in the transmission side, through the alternate path (B1: diagnosis Tx in FIG. 1). In addition, the diagnosis device 50 transmits the test frame in which processing according to the content is performed in the reception side through the alternate path (B2: diagnosis Rx in FIG. 1). In a case where the processing according to the content of the test frame is not performed in the coupling control device 20, the diagnosis device 50 diagnoses that the error occurs in the alternate path.

In a case where the transmission path from the control device 10 to the coupling devices 41, 42, and 43 is the SAS coupling, the OAF can be used as the test frame. A transmission destination address (destination SAS address), a transmission destination address (source SAS address), a CRC, and the like are included in the OAF. If the content of the OAF is correctly interpreted in the coupling control device 20 side, the response (for example, arbitration in progress (AIP)) can be obtained within a predetermined time (for example, an arbitration wait time (AWT)). Therefore, by monitoring the presence or absence of the response and the like, the diagnosis described above can be performed.

In the description above, for the convenience of the description, the example of SAS coupling is described. However, a transmission path other than the SAS coupling may be applied in the technology in the first embodiment. For example, a transmission path regulated in an interface protocol such as a fiber channel (FC) and a non-volatile memory express (NVMe) can be applied. In addition, the OAF is described as an example of the test frame, an arbitrary frame having a content usable for determining whether or not the diagnosis target interprets the content of the test frame can be used as the test frame. This modification also belongs to the scope of the technology in the first embodiment.

The first embodiment was described as above.

<2. Second Embodiment>

Next, a second embodiment will be described. The second embodiment relates to a mechanism for specifying a failure location in the frame transmission path, and particularly relates to a technology enabling the specification of the failure location in a case where a failure occurs in the logic circuit interpreting the frame.

[2-1. Storage Device]

Figure 2:
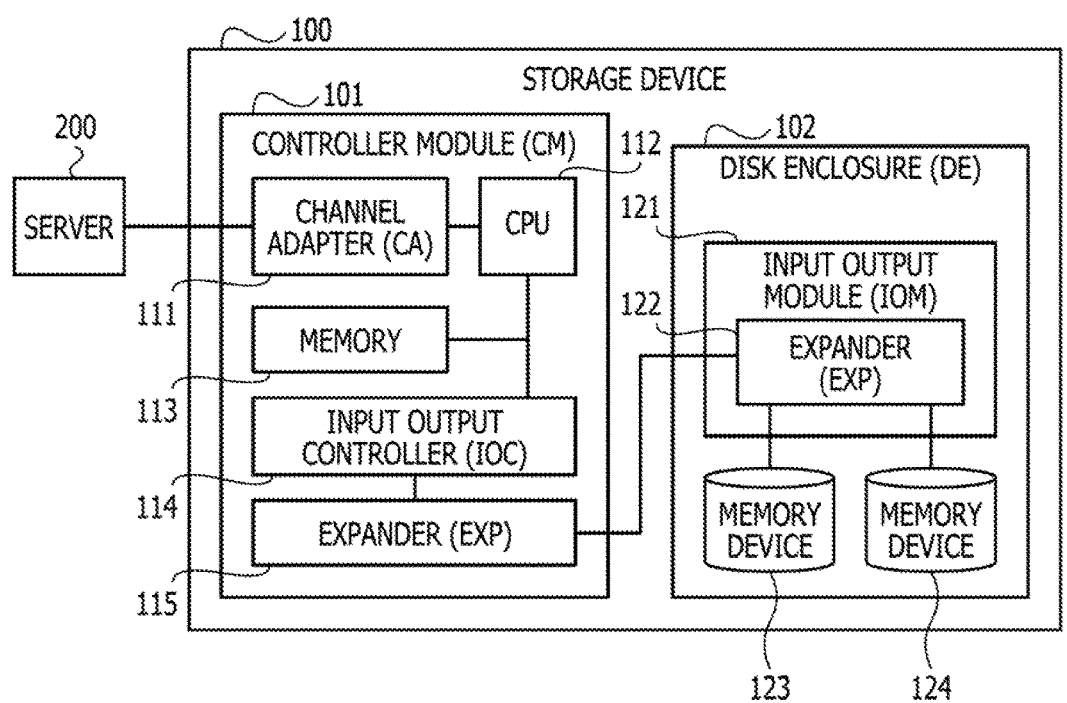
FIG. 2 is a diagram illustrating an example of a storage device in a second embodiment.

A storage device 100 will be described referring to FIG. 2. The storage device 100 illustrated in FIG. 2 is an example of a storage device in the second embodiment. FIG. 2 is a diagram illustrating an example of the storage device in the second embodiment.

As illustrated in FIG. 2, the storage device 100 includes a controller module (CM) 101 and a drive enclosure (DE) 102. The CM 101 controls reading and writing a data from and to the DE 102. In addition, the CM 101 is coupled to a server 200 that accesses to the data in the DE 102.

The CM 101 includes a channel adapter (CA) 111, a CPU 112, a memory 113, an input output controller (IOC) 114 and an expander (EXP) 115. The CPU 112 performs processing based on a program stored in, for example, the memory 113.

The CA 111 is a communication interface for coupling the CM 101 and the server 200. For example, in a case where the storage device 100 and the server 200 are couple by the FC, the CA 111 becomes an interface to a host bus adapter (HBA) of the server 200 or to the CM 101 coupled to a fabric (not illustrated) between the server 200 and the storage device 100.

The CPU 112 controls an operation of the CM 101. In addition, the CPU 112 causes the DE 102 to perform the diagnosis on the failure location in a case where an error is detected during the processing (hereafter, referred to as connection establishment processing) for establishing the transmission path to the access destination in the DE 102. The memory 113 stores, for example, a program regulating the operation of the CPU 112 or data generated during the processing by the CPU 112. The memory 113 is RAM, an HDD, a solid state drive (SSD), a flash memory, or the like.

The IOC 114 performs the connection establishment processing between the CPU 112 and the access destination when the CPU 112 accesses to the data in the DE 102. The connection establishment processing will be described in the later stage (refer to the description in FIG. 4 described below) with an example of a case of the SAS coupling. The EXP 115 is an expansion device that couples the memory device such as the HDD and RAID device, and in the example in FIG. 2, the DE 102 is coupled.

The DE 102 includes an input output module (IOM) 121 and memory devices 123 and 124. The IOM 121 includes an expander (EXP) 122. The EXP 115 of the CM 101 is coupled to the EXP 122 of the DE 102. The memory devices 123 and 124 are, for example, the devices such as the HDD, the SSD, or the RAID.

Figure 3:
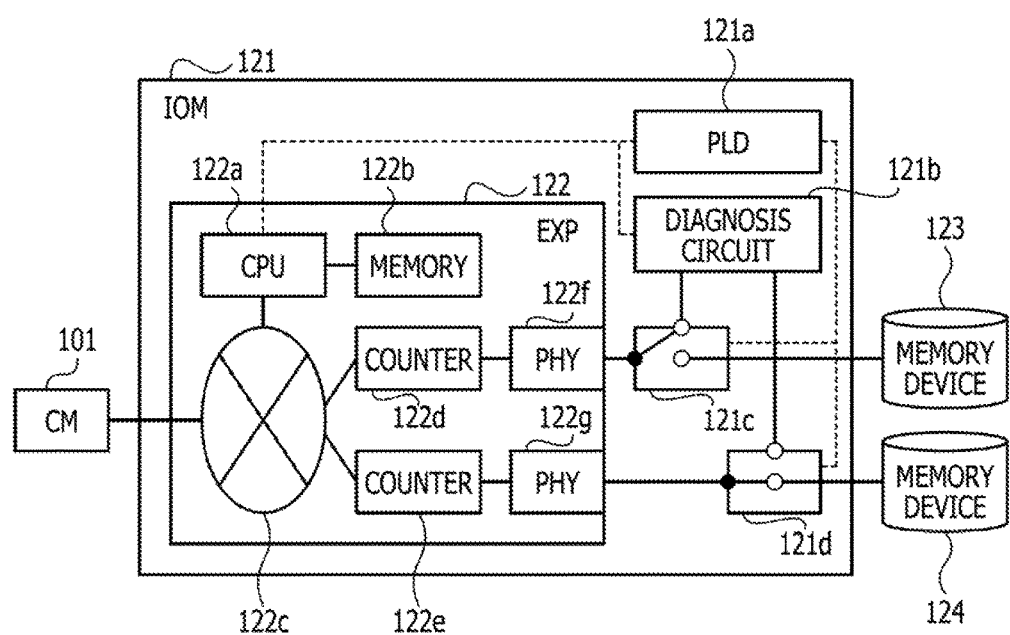
FIG. 3 is a diagram illustrating an example of an IOM in the second embodiment.

Here, the IOM 121 will be further described referring to FIG. 3. FIG. 3 is a diagram illustrating an example of the IOM in the second embodiment.

As illustrated in FIG. 3, the IOM 121 includes a programmable logic device (PLD) 121a, a diagnosis circuit 121b, switches (SW) 121c and 121d, and an EXP 122. The diagnosis circuit 121b is an FPGA incorporating a diagnostic function described below or a processor such as a CPU that operates based on the program regulating the diagnostic function.

The PLD121a is coupled to the diagnosis circuit 121b and the SWs 121c and 121d. In addition, the PLD121a controls the SWs 121c and 121d according to the instruction from the EXP 122. The SW 121c is a switch that switches a transmission path reaching the memory device 123 to a transmission path reaching the diagnosis circuit 121b (hereafter, referred to as the alternate path). The SW 121d is a switch that switches a transmission path reaching the memory device 124 to an alternate path reaching the diagnosis circuit 121b.

The PLD121a controls at least one of the SWs 121c and 121d and switches the transmission path designated for the EXP122 to the alternate path. The diagnosis circuit 121b transmits and receives the test frame via the alternate path and diagnoses the presence or absence of the failure in the EXP 122 by checking whether or not the test frame can be correctly transmitted and received. In a case of the SAS coupling, for example, the OAF can be used as the test frame.

The EXP 122 includes a CPU 122a, a memory 122b, a crossbar switch 122c, counters 122d and 122e, and physical ports (PHY) 122f and 122g. The CPU 122a controls an operation of the EXP 122. In addition, the CPU 122a controls the PLD121a and the diagnosis circuit 121b, and performs the diagnosis in the alternate path.

The memory 122b is, for example, RAM, a flash memory or the like. For example, a program regulating the operation of the CPU 122a is stored in the memory 122b. In addition, information items (information items on the transmission path) in the memory devices 123 and 124 coupled to the PHYs 122f and 122g are stored in the memory 122b. For example, the information items on the transmission path are the information items that associate the addresses in the memory devices 123 and 124 and the identifiers in the PHYs 122f and 122g.

The crossbar switch 122c is a switch that switches the transmission path between the CM101 and the PHY122f and the transmission path between the CM101 and the PHY122g. The switching operation by the crossbar switch 122c is controlled by the CPU122a.

The counter 122d counts the number of errors occurring in the transmission path linking the PHY 122f and the memory device 123. The counter 122*e* counts the number of errors occurring in the transmission path linking the PHY122*g* and the memory device 124.

For example, when an environment in the transmission path linking the PHY 122*f* and the memory device 123 deteriorates and a bit error occurs in the frame transmitted from the PHY 122*f*, for example, a retransmission request or an error notification is sent to the PHY 122*f* from the memory device 123. The counter 122*d* counts the number of the retransmission requests or the error notifications. In a case where the bit error occurs in the frame transmitted from the memory device 123 to the PHY 122*f*, the operations described above are similarly performed.

As described above, by providing the counters 122*d* and 122*e*, it is possible to detect the occurrence of the errors caused by the environmental deterioration in the transmission path. However, in a case where there is a failure in the logic circuit of the PHYs 122*f* and 122*g* and the memory devices 123 and 124, and the error detection by the CRC or the like is not performed, the error actually occurring due to the failure may not be reflected on the count values of the counters 122*d* and 122*e*.

In a case where this kind of failure occurs, since the response to the frame is not returned to the CM101, there occurs the timeout. When the timeout occurs, the CPU 112 of the CM 101 controls the EXP 122 of the IOM 121, and the diagnosis is performed by the diagnosis circuit 121*b*.

For example, the CPU 112 designates the information on the transmission path in which the time out occurs and transmits a diagnosis instruction to the CPU122*a* of the EXP 122 so as to perform the diagnosis on the transmission path. The CPU 122*a* controls the PLD 121*a* and switches the diagnosis target transmission path to the alternate path according to the diagnosis instruction, and then, controls the diagnosis circuit 121*b* and performs the diagnosis. The processing or the like relating to the diagnosis will be further described below.

2-2. Processing Flow

Before describing the processing relating to performing of the diagnosis, first, the connection establishment processing in the SAS coupling will be described referring to FIG. 4. Subsequently, the specification of the failure location by the processing relating to the performing of the diagnosis will be described referring to FIG. 6.

(Connection Establishment Processing)

Figure 4:
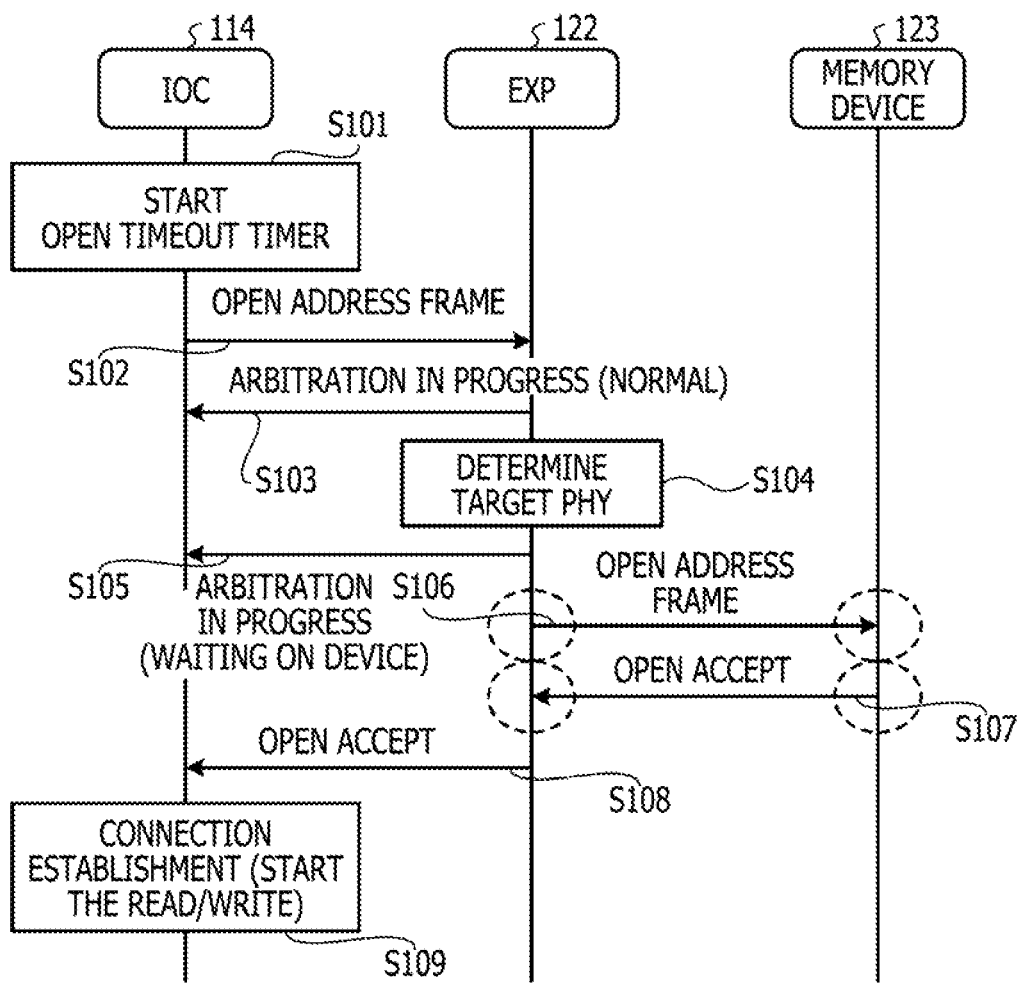
FIG. 4 is a sequence diagram for describing connection establishment processing.
Figure 5:
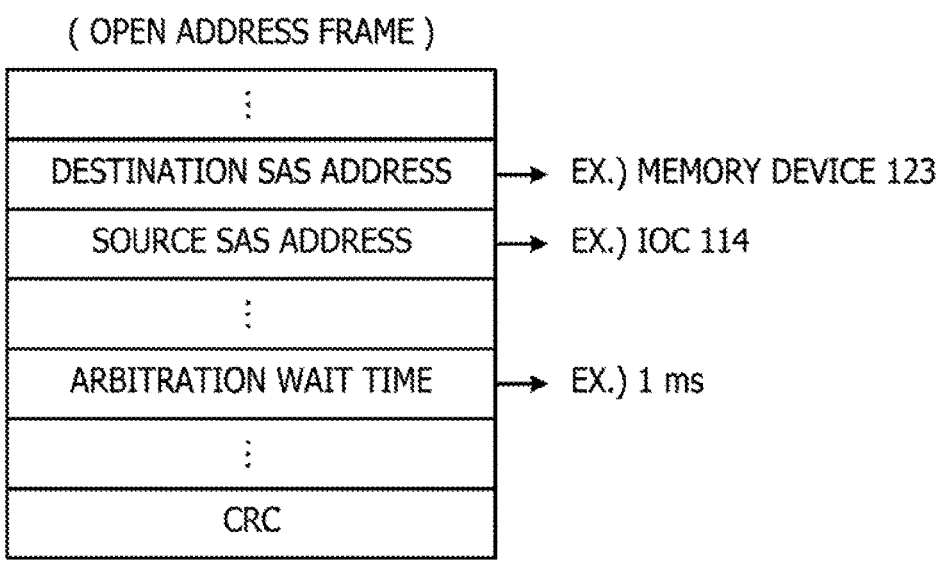
FIG. 5 is a diagram illustrating an example of an OAF.

Refer to FIG. 4. FIG. 4 is a sequence diagram for describing the connection establishment processing. During the description relating to FIG. 4, a structure of the OAF will be described referring to FIG. 5. FIG. 5 is a diagram illustrating an example of the OAF.

(S101, S102) The IOC 114 starts a timer (open timeout timer) that measures a time from the transmission of the OAF to the response thereto. In addition, the IOC 114 transmits the OAF to the EXP 122. The OAF transmitted by the IOC 114 is received by the CPU 122*a* of the EXP 122.

(S103) The CPU 122*a* of the EXP 122 received the OAF transmits an AIP (normal) to the IOC 114. The AIP (normal) transmitted by the CPU 122*a* is received by the IOC 114.

The IOC 114 determines whether or not the time elapsed from the transmission of the OAF to the reception of the AIP (normal) is within a threshold value (for example, 1 ms) referring to the value of the timer. In a case where the elapsed time exceeds the threshold value, the IOC 114 notifies the server 200 of the occurrence of the error due to the timeout, and ends the connection establishment processing.

(S104, S105) Referring to a content of the OAF, the CPU 122*a* of the EXP 122 determines a PHY (hereafter, a target PHY, in this example, the PHY 122*f*) to which a connection target device (hereafter, referred to as a target device; in this example, the memory device 123) is coupled.

As illustrated in FIG. 5, address information (DESTINATION SAS ADDRESS) of the target device is included in the OAF. In addition, transmission path information that associates an identifier that identifies the PHYs 122*f* and 122*g* and the address information of the devices (the memory devices 123 and 124) that are respectively coupled to the PHYs 122*f* and 122*g* are stored in the memory 122*b* of the EXP 122.

Therefore, the CPU122*a* reads the address information of the target device from the OAF and extracts the identifier of the PHY corresponding to the read address information from the transmission path information, and then can determine the target PHY. The address information (SOURCE SAS ADDRESS) indicating the transmission destination of the OAF, the threshold value (ARBITRATION WAIT TIME) used for the determination of the timeout of the AIP, a CRC used for the detection of the error in the OAF, and the like are included in the OAF.

The CPU 122*a* that determined the target PHY transmits the AIP (Waiting on Device) to the IOC114. The IOC 114 can recognize the fact that the determination of the target PHY is finished by receiving the AIP (Waiting on Device).

(S106) The CPU 122*a* of the EXP 122 controls the crossbar switch 122*c* and switches the PHY to the target PHY (PHY 122*f*) in the transmission path. In addition, the CPU 122*a* inputs the OAF received from the IOC 114 to the PHY 122*f* and transmits the OAF to the memory device 123 through the PHY 122*f*. At this time, in a case where a failure is present in the PHY 122*f*, the OAF may not be correctly transmitted to the memory device 123. In addition, in a case where a failure is present in the reception circuit in the memory device 123, the OAF may not be correctly received in the memory device 123.

(S107) The memory device 123 correctly received the OAF transmits the response to the OAF (Open Accept (OA)) to the EXP122. At this time, in a case where a failure is present in a transmission circuit of the memory device 123, in some cases, the OA is not correctly transmitted from the memory device 123. In addition, in a case where a failure is present in the PHY 122*f*, in some cases, the OA is not correctly received by the EXP122. In some cases, the retransmission request or the error notification is sent to the EXP 122 from the memory device 123 according to the result of detection of the error (occurrence of the bit error) by the CRC.

(S108, S109) The CPU122*a* of the EXP 122 correctly received the OA transmits the OA received from the memory device 123 to the IOC 114. The IOC 114 received the OA recognizes that the connection is finished, and starts the reading and writing (read/write) of the data from and to the memory device 123.

As described above, in a case where a failure is present in the transmission function or the reception function of the target PHY (PHY 122*f*) or in the transmission circuit or the reception circuit of the target device (memory device 123). In some cases, the OAF or the OA is not correctly transmitted or received. For example, in a case where a failure is present in the logic circuit which interprets a content of the OAF or the OA, in the transmission circuit or the reception circuit of the target device, in some cases, the processing according to the content is not performed and processing for continuously sending a standby (Idle) signal or the like is performed.

When a bit error due to the deterioration of the physical transmission quality occurs, it is possible to specify the reason of the error by referring to the count value of the counter 122*d*. On the other hand, as described above, even when the target PHY continues to receive the standby signal, since the count value by the counter 122*d* does not incrementally increase, it is not possible to specify the reason even referring to the counter value of the counter 122*d*. In addition, in a case where a failure is present in the logic circuit of the target device, even if the target device is requested to perform processing so as to transmit the response with including the fault information in the response of the OAF, the response is not expected to be received.

The IOC 114 expects to receive the OA from the target device as a response to the OAF. In addition, the IOC 114 monitors an elapsed time from the transmission of the OAF to the reception of the OA using a timer, and determines that the OA is not received in time (timeout) in a case where the elapsed time exceeds a predetermined time (for example, 20 ms). The elapsed time may be a time from the reception of the AIP (Waiting on Device) by the IOC 114 to a reception of the OA. In this case, the IOC 114 resets the timer when receiving the AIP (Waiting on Device) and measures the elapsed time to the reception of the OA.

In a case where the timeout occurs in receiving the OA, for example, the IOC 114 inquires the count value of the counter 122*d* of the EXP 122. In a case where the count value exceeds the predetermined threshold value (for example, 50 times), the IOC 114 can specify that the reason is the deterioration of the physical transmission quality between the EXP122 and the memory device 123. On the other hand, in a case where the count value does not exceed the predetermined threshold value, it is difficult for the IOC114 to immediately specify that a failure is present in any one of the transmission function and the reception function of the EXP 122 and the transmission circuit and the reception circuit of the memory device 123.

For example, it may be possible to specify the failure location by separating (closing) the path reaching the target device and applying a method of re-performing the diagnosis of the failure location. However, it may cause such a harmful effect that the non-desirable exchange of components occurs or it takes time to specify the failure location. In order to avoid the harmful effect, the storage device 100 in the second embodiment performs the failure location specification processing illustrated in FIG. 6.

(Specification of Failure Location)

Figure 6:
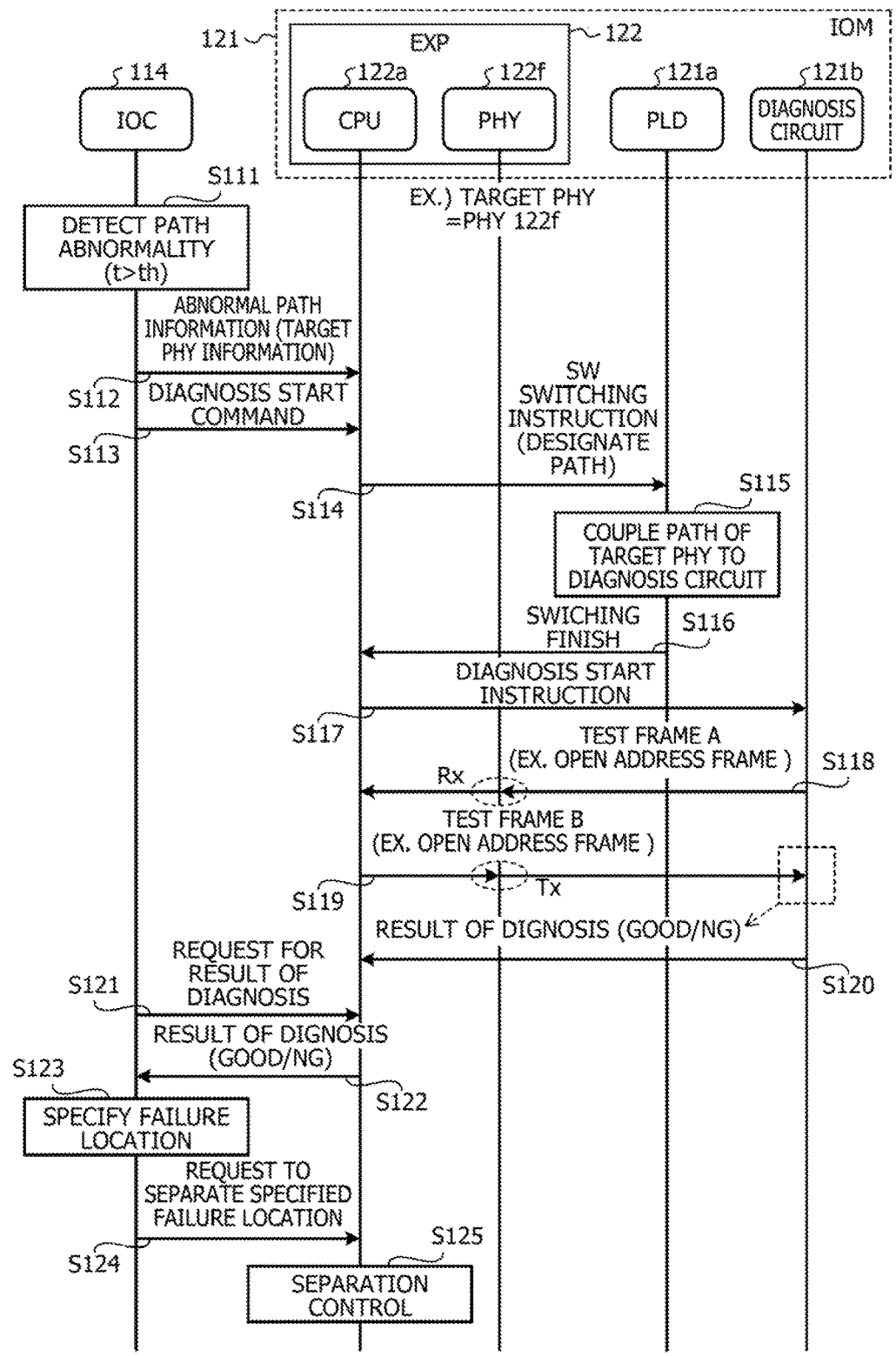
FIG. 6 is a sequence diagram illustrating a flow of failure location specification processing performed by the storage device in the second embodiment when a path abnormality occurs.

The failure location specification processing by the storage device 100 will be described referring to FIG. 6. FIG. 6 is a sequence diagram illustrating a flow of failure location specification processing performed by the storage device in the second embodiment when a path abnormality occurs.

(S111) In a case where the response (OA) to the OAF is not received in time (timeout) from the target device (in this example, the memory device 123) (in a case where the path abnormality is detected), the IOC 114 advances the process to S112 and subsequent thereto. For example, in a case where an elapsed time t to the reception of the OA exceeds a predetermined threshold value th (for example, 20 ms), the IOC 114 advances the process to S112 and subsequent thereto.

(S112, S113) The IOC 114 transmits information on the transmission path (hereafter, referred to as an abnormal path) where the timeout occurs (hereinafter, referred to as abnormal path information) to the CPU 122*a* of the EXP 122. The abnormal path information including the target PHY information (identifier of the PHY or the like) is transmitted using, for example, SCSI enclosure service (SES) information. In this example, the identifier of the PHY 122*f* is included in the abnormal path information. In addition, the IOC 114 transmits a diagnosis start command to the CPU 122*a* for instructing the CPU 122*a* to diagnose the failure location in the abnormal path together with the abnormal path information.

(S114) The CPU 122*a* of the EXP 122 that received the diagnosis start command specifies the target PHY referring to the abnormal path information received from the IOC114. The CPU 122*a* designates the abnormal path (the target PHY) and instructs the PLD121*a* to couple the switch (in this example, SW 121*c*) corresponding to the abnormal path to the diagnosis circuit 121*b* (SW switching instruction).

(S115, S116) The PLD121*a* that received the SW switching instruction controls the SW 121*c* and couples the path of the target PHY (in this example, the transmission path linking the PHY 122*f* and the memory device 123) to the diagnosis circuit 121*b*. The PLD 121*a* notifies the CPU 122*a* of the fact (switching finish) that the switching of the SW 121*c* is finished.

(S117) The CPU 122*a* that received the notification of switching finish from the PLD 121*a* instructs the diagnosis circuit 121*b* to start the diagnosis (diagnosis start instruction).

(S118) The diagnosis circuit 121*b* that received the diagnosis start instruction transmits a test frame A to the PHY 122*f*. A content of the test frame A is arbitrary and for example, the OAF can be used. The test frame A correctly received by the PHY 122*f* is input to the CPU122*a* from the PHY 122*f*. The configuration may be modified in such a manner that a notification indicating a successful reception of the test frame A is input to the CPU 122*a* from the PHY 122*f*.

(S119) In a case where the test frame A is correctly received by the PHY 122*f*, the CPU 122*a* inputs a test frame B to the PHY 122*f*. The PHY 122*f* transmits the test frame B input from the CPU 122*a* to the diagnosis circuit 121*b*. A content of the test frame B is arbitrary, and for example, the OAF can be used.

(S120) In a case where the test frame A is not normally received by the PHY 122*f*, the test frame B is not transmitted to the diagnosis circuit 121*b*.

In a case where the test frame B may not be transmitted from the PHY 122*f* also, the test frame B is not transmitted to the diagnosis circuit 121*b*. In these cases, the diagnosis circuit 121*b* may not receive the test frame B.

In a case where the test frame B can be received, the diagnosis circuit 121*b* transmits a result of diagnosis (GOOD) indicating that the PHY 122*f* is not the failure location to the CPU 122*a* of the EXP 122. On the other hand, in a case where the elapsed time from the transmission of the test frame A exceeds a predetermined time (for example, 5 ms) while the test frame B is not received, the diagnosis circuit 121*b* transmits the result of diagnosis (NG) indicating that the PHY 122*f* is the failure location to the CPU 122*a*. The CPU 122*a* holds the result of diagnosis received from the diagnosis circuit 121*b* in the memory 122*b*.

(S121, S122) The IOC114 requests the CPU 122*a* of the EXP 122 for the result of diagnosis (request for the result of diagnosis). For example, the IOC114 requests the CPU122*a* for the result of diagnosis at the timing when a predetermined time (for example, 80 ms) has elapsed from the transmission of the diagnosis start command. The CPU 122*a* that received the request transmits the result of diagnosis held in the memory 122b to the IOC 114.

(S123) In a case where the result of diagnosis received from the CPU 122a is GOOD, the IOC 114 specifies the memory device 123 which is the target device as the failure location. On the other hand, in a case where the result of diagnosis received from the CPU 122a is NG, the IOC 114 specifies the PHY 122f of the EXP 122 as the failure location.

(S124, S125) The IOC 114 requests the CPU 122a of the EXP 122 to separate the specified failure location. The CPU 122a separates the failure location in response to this request (separation control). The IOC 114 inputs the specified failure location information and information indicating that the separation control is finished to the CPU 112 of the CM 101. The CPU 112 provides the information input from the IOC 114 to the server 200 via the CA 111.

As above, the storage device 100 and the processing performed by the storage device 100 and in the second embodiment are described.

[2-3. Modification Example and the Like]

Here, a modification example and the like in the second embodiment will be described.

(Modification Example #1: Using a Non-Used PHY)

In the description above, for the convenience of description, the devices (the memory devices 123 and 124) are described to be coupled to all the PHYs (the PHYs 122f and 122g) (refer to FIG. 3). Therefore, the diagnosis circuit 121b performs the diagnosis according to the result of receiving the test frame B, and then, returns the result of diagnosis to the CPU 122a of the EXP 122.

Figure 7:
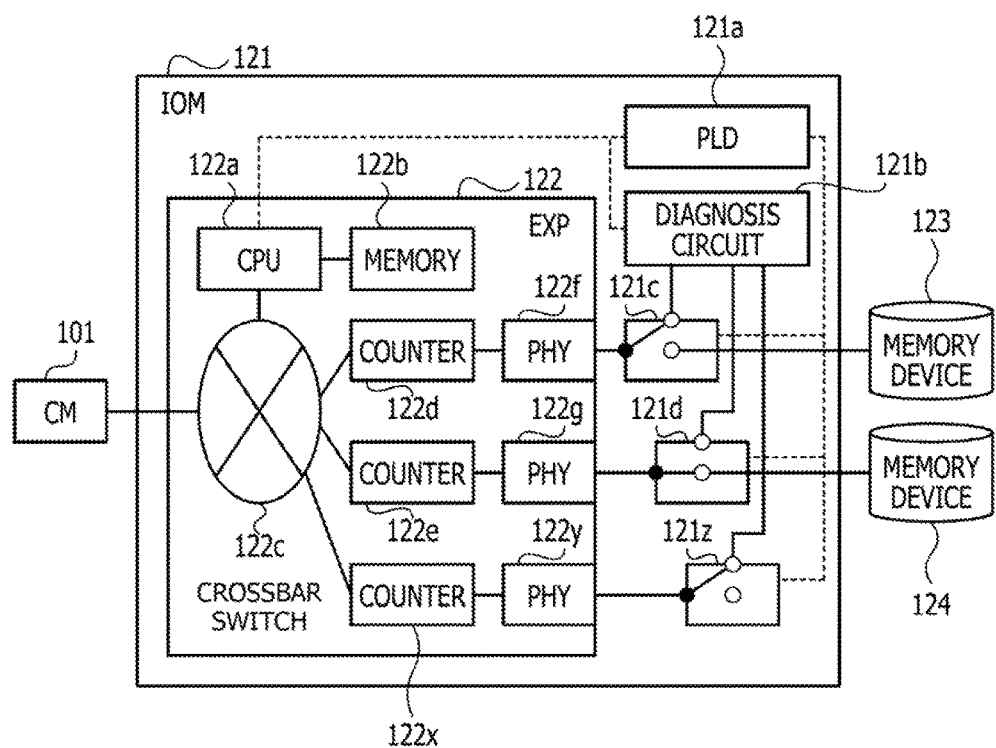
FIG. 7 is a diagram illustrating an example of an IOM in a modification example (modification example #1) in the second embodiment.

However, actually in some cases, there is a PHY to which the devices are not coupled (non-used PHY). For example, as illustrated in FIG. 7, there is a non-used PHY (a PHY122y) in the EXP 122. FIG. 7 is a diagram illustrating an example of an IOM in a modification example (modification example #1) in the second embodiment. In a case where there is a non-used PHY as above, using the non-used PHY, it is possible to simplify the flow of the diagnosis. The modification example #1 relates to the simplified mechanism.

The PHY122y has a function similar to that of the PHYs 122f and 122g described above. In addition, a counter 122x is provided between the PHY122y and the crossbar switch 122c. The counter 122x has a function similar to that of the counters 122d and 122e. In addition, a SW 121z that switches the transmission path to the diagnosis circuit 121b is provided at the device side of the PHY122y. The SW 121z has a function similar to that of the SWs 121c and 121d.

Figure 8:
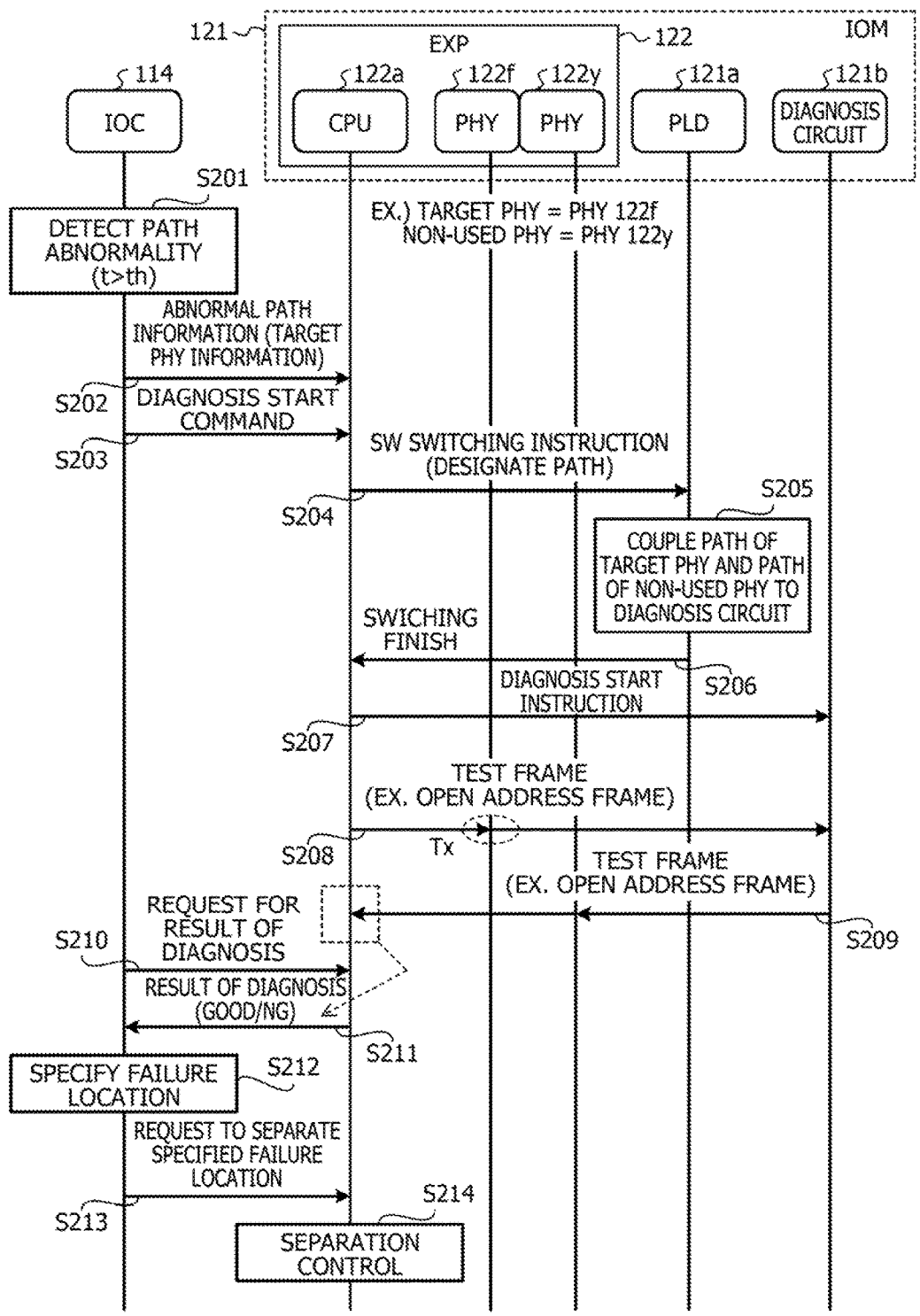
FIG. 8 is a sequence diagram illustrating a flow of failure location specification processing performed by a storage device in a modification example (modification example #1) in the second embodiment when a path abnormality occurs.

The IOM 121 illustrated in FIG. 7 specifies the failure location along a processing flow illustrated in FIG. 8. FIG. 8 is a sequence diagram illustrating a flow of failure location specification processing performed by a storage device in a modification example (modification example #1) in the second embodiment when a path abnormality occurs. In the example in FIG. 8, the target PHY is the PHY 122f and the non-used PHY is the PHY122y.

(S201) In a case where the response (OA) to the OAF is not received in time (timeout) from the target device (in this example, the memory device 123) (in a case where the path abnormality is detected), the IOC 114 advances the process to S202 and subsequent thereto. For example, in a case where an elapsed time t to the reception of the OA exceeds a predetermined threshold value th (for example, 20 ms), the IOC 114 advances the process to S202 and subsequent thereto.

(S202, S203) The IOC 114 transmits information on the transmission path (the abnormal path) where the timeout occurs (the abnormal path information) to the CPU 122a of the EXP 122. The abnormal path information including the target PHY information (identifier of the PHY or the like) is transmitted using, for example, the SES information. In this example, the identifier of the PHY 122f is included in the abnormal path information. In addition, the IOC 114 transmits a diagnosis start command to the CPU 122a for instructing the CPU 122a to diagnose the failure location in the abnormal path together with the abnormal path information.

(S204) The CPU 122a of the EXP 122 that received the diagnosis start command specifies the target PHY referring to the abnormal path information received from the IOC114. The CPU 122a designates the abnormal path (the target PHY) and instructs the PLD121a to couple the switch (in this example, SW 121c) corresponding to the abnormal path to the diagnosis circuit 121b (SW switching instruction).

(S205, S206) The PLD121a that received the SW switching instruction controls the SW 121c and couples the path of the target PHY (in this example, the transmission path linking the PHY 122f and the memory device 123) to the diagnosis circuit 121b. In addition, the PLD121a controls the switch corresponding to the non-used PHY (in this example, the SW121z) and couples the path positioned at the device side of the non-used PHY to the diagnosis circuit 121b. The PLD 121a notifies the CPU 122a of the switching finish.

(S207, S208) The CPU 122a that received the notification of switching finish from the PLD 121a instructs the diagnosis circuit 121b to start the diagnosis (diagnosis start instruction). The CPU122a inputs a test frame to the PHY 122f. The PHY 122f transmits the test frame input from the CPU122a to the diagnosis circuit 121b. A content of the test frame is arbitrary, and for example, the OAF can be used.

(S209) The diagnosis circuit 121b transmits the test frame received from the PHY 122f to the non-used PHY (PHY122y). At this time, the diagnosis circuit 121b transfers the test frame to the PHY 122y as it is without interpreting the content of the test frame. The test frame received by the PHY 122y is input to the CPU122a from the PHY 122y. The configuration may be modified to a mechanism in which a notification indicating that the test frame is received is input to the CPU122a from the PHY 122y.

In a case where the test frame can be received by the PHY122y, the CPU 122a holds the result of diagnosis (GOOD) indicating that the PHY 122f is not the failure location in the memory 122b. On the other hand, in a case where the test frame is not received even if the elapsed time from the transmission of the test frame exceeds a predetermined time (for example, 5 ms), the CPU 122a holds the result of diagnosis (NG) indicating that the PHY 122f is the failure location in the memory 122b.

(S210, S211) The IOC 114 requests the CPU 122a of the EXP 122 for the result of diagnosis (request for the result of diagnosis). For example, the IOC114 requests the CPU122a for the result of diagnosis at the timing when a predetermined time (for example, 80 ms) has elapsed from the transmission of the diagnosis start command. The CPU 122a receiving this request transmits the result of diagnosis held in the memory 122b to the IOC 114.

(S212) In a case where the result of diagnosis received from the CPU 122a is GOOD, the IOC 114 specifies the memory device 123 which is the target device as the failure location. On the other hand, in a case where the result of diagnosis received from the CPU 122*a* is NG, the IOC 114 specifies the PHY 122*f* of the EXP 122 as the failure location.

(S213, S214) The IOC 114 requests the CPU 122*a* of the EXP 122 to separate the specified failure location. The CPU 122*a* separates the failure location in response to this request (separation control). The IOC 114 inputs the specified failure location information and information indicating that the separation control is finished to the CPU 112 of the CM 101. The CPU 112 provides the information input from the IOC 114 to the server 200 via the CA 111.

As above, the storage device 100 and the flow of the processing performed by the storage device 100 in the modification example #1 are described. According to the modification example #1, the diagnosis circuit 121*b* merely transfers the test frame to the non-used PHY without understanding the content of the test frame, it is possible to simplify the function of the diagnosis circuit 121*b*.

(Modification Example #2: Use of Intelligent Switch (iSW))

Next, another modification example (modification example #2) will be described.

In the modification example #1, a mechanism for simplifying the function of the diagnosis circuit 121*b* using the non-used PHY was described. On the other hand, in the modification example #2 relates to a mechanism in which a function of interpreting the content of the frame is mounted on the switch (SW121*c* or the like) that switches the transmission path to the diagnosis circuit 121*b*, and thus, the diagnosis circuit 121*b* is omitted. Hereinafter, a switch mounting this function is referred as an intelligent switch (hereafter referred to as an iSW).

Figure 9:
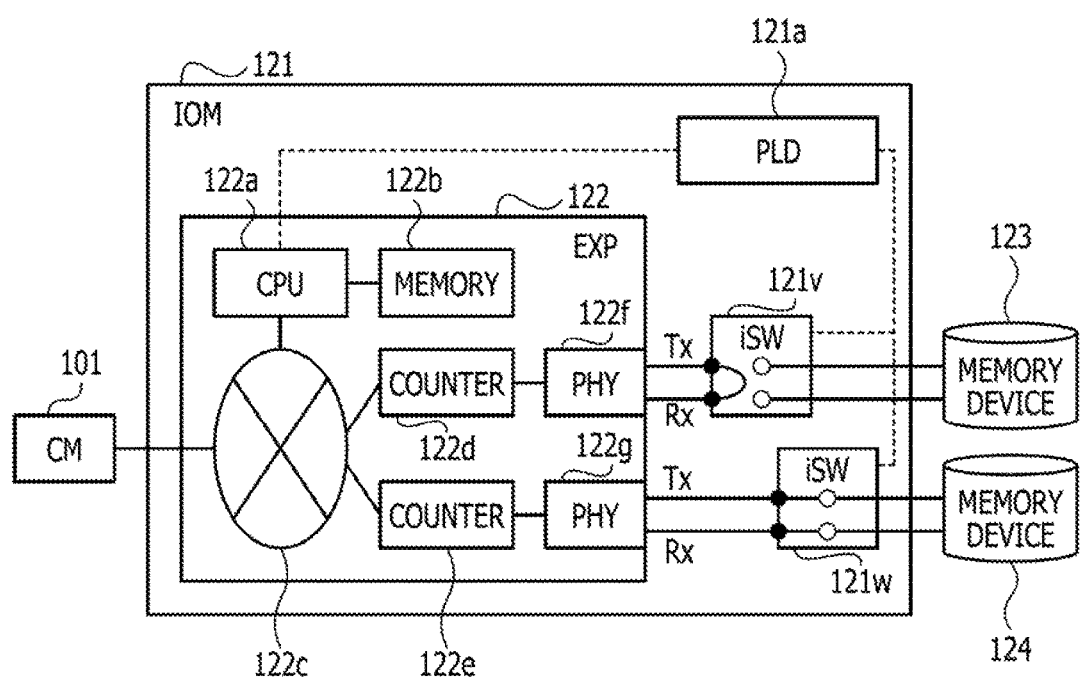
FIG. 9 is a diagram illustrating an example of an IOM in a modification example (modification example #2) in the second embodiment.

An IOM121 in the modification example #2 is modified as that illustrated in FIG. 9. FIG. 9 is a diagram illustrating an example of the IOM in a modification example (modification example #2) in the second embodiment. The IOM121 in the modification example #2 is different from the IOM121 illustrated in FIG. 3 in a point that an iSWs121*v* and 121*w* are provided instead of the SWs 121*c* and 121*d*.

The iSW121*v* is provided on the transmission path between the PHY 122*f* and the memory device 123, and has a function of switching the path to and from the normal transmission path and a loopback path. The normal transmission path is a path that links a transmission (Tx) port of the PHY 122*f* and a reception port of the memory device 123 and a path that links a transmission port of the memory device 123 and a reception port of the PHY 122*f*. On the other hand, the loopback path is a path that directly links a transmission (Tx) port of the PHY 122*f* and a reception (Rx) port.

The iSW121*w* has a function of switching the path to and from the normal transmission path that links the PHY122*g* and the memory device 124 and the loopback path that links the transmission port (Tx) port of the PHY122*g* and the reception (Rx) port. The PLD121*a* controls the switching of the path by the iSWs 121*v* and 121*w*. In addition, the path switching control by the PLD121*a* is performed based on the instruction from the CPU 122*a* of the EXP 122.

Figure 10:
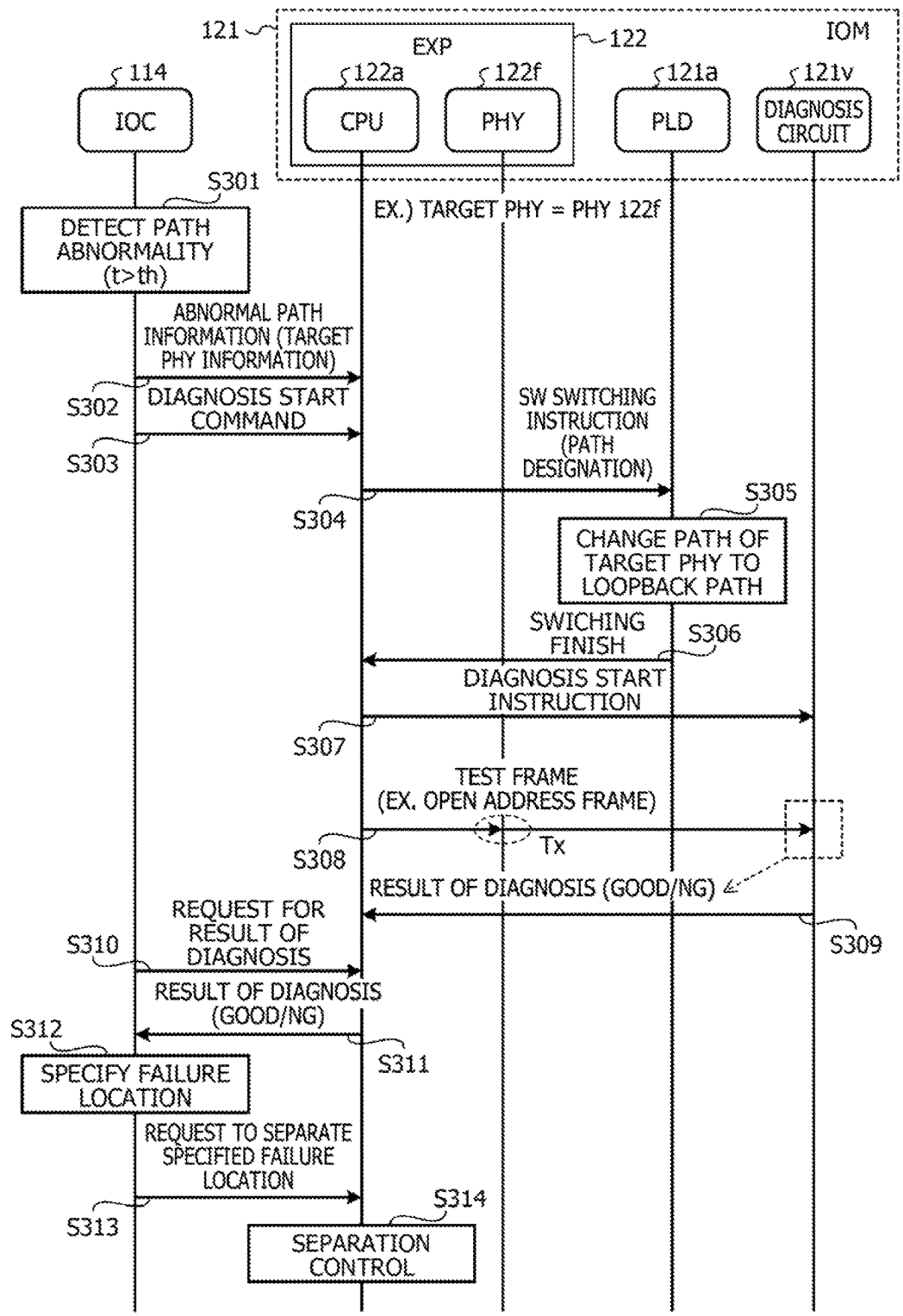
FIG. 10 is a sequence diagram illustrating a flow of failure location specification processing performed by the storage device in a modification example (modification example #2) in the second embodiment when a path abnormality occurs.

The IOM 121 illustrated in FIG. 9 specifies a failure location along, for example, the processing flow illustrated in FIG. 10. FIG. 10 is a sequence diagram illustrating a flow of failure location specification processing performed by the storage device in a modification example (modification example #2) in the second embodiment when a path abnormality occurs. In an example in FIG. 10, the target PHY is assumed to be the PHY 122*f*.

(S301) In a case where the response (OA) to the OAF is not received in time (timeout) from the target device (in this example, the memory device 123) (in a case where the path abnormality is detected), the IOC 114 advances the process to S302 and subsequent thereto. For example, in a case where an elapsed time t to the reception of the OA exceeds a predetermined threshold value th (for example, 20 ms), the IOC 114 advances the process to S302 and subsequent thereto.

(S302, S303) The IOC 114 transmits information on the transmission path (the abnormal path) where the timeout occurs (the abnormal path information) to the CPU 122*a* of the EXP 122. The abnormal path information including the target PHY information (identifier of the PHY or the like) is transmitted using, for example, the SES information. In this example, the identifier of the PHY 122*f* is included in the abnormal path information. In addition, the IOC 114 transmits a diagnosis start command to the CPU 122*a* for instructing the CPU 122*a* to diagnose the failure location in the abnormal path together with the abnormal path information.

(S304) The CPU 122*a* of the EXP 122 that received the diagnosis start command specifies the target PHY referring to the abnormal path information received from the IOC114. The CPU 122*a* designates the abnormal path (the target PHY) and instruct the PLD121*a* to switch the switch (in this example, iSW 121*v*) corresponding to the abnormal path to the loopback path (SW switching instruction).

(S305, S306) The PLD121*a* that received the SW switching instruction controls the iSW 121*v* and switches the path of the target PHY (in this example, the transmission path linking the PHY 122*f* and the memory device 123) to the loopback path. The PLD 121*a* notifies the CPU 122*a* of the switching finish.

(S307, S308) The CPU 122*a* that received the notification of switching finish from the PLD 121*a* instructs the iSW121*v* to start the diagnosis (diagnosis start instruction). The CPU122*a* inputs the test frame to the PHY 122*f*. The PHY 122*f* transmits the test frame received from the CPU122*a* to the iSW121*v*. A content of the test frame is arbitrary, and for example, the OAF can be used.

(S309) In a case where the test frame transmitted from the PHY 122*f* can be received, the iSW121*v* transmits the result of diagnosis (GOOD) indicating that the PHY 122*f* is not the failure location to the CPU 122*a* of the EXP 122. On the other hand, in a case where the test frame is not received even if the elapsed time from the transmission of the diagnosis start instruction exceeds a predetermined time (for example, 5 ms), the iSW121*v* transmits the result of diagnosis (NG) indicating that the PHY 122*f* is the failure location to the CPU122*a*. The CPU 122*a* holds the result of diagnosis received from the iSW121*v* in the memory 122*b*.

(S310, S311) The IOC 114 requests the CPU 122*a* of the EXP 122 for the result of diagnosis (request for the result of diagnosis). For example, the IOC114 requests the CPU122*a* for the result of diagnosis at the timing when a predetermined time (for example, 80 ms) has elapsed from the transmission of the diagnosis start command. The CPU 122*a* receiving the request transmits the result of diagnosis held in the memory 122*b* to the IOC 114.

(S312) In a case where the result of diagnosis received from the CPU 122*a* is GOOD, the IOC 114 specifies the memory device 123 which is the target device as the failure location. On the other hand, in a case where the result of diagnosis received from the CPU 122*a* is NG, the IOC 114 specifies the PHY 122*f* of the EXP 122 as the failure location.

(S313, S314) The IOC 114 requests the CPU 122*a* of the EXP 122 to separate the specified failure location. The CPU 122*a* separates the failure location in response to this request (separation control). The IOC 114 inputs the specified failure location information and information indicating that the separation control is finished to the CPU 112 of the CM 101. The CPU 112 provides the information input from the IOC 114 to the server 200 via the CA 111.

As above, the storage device 100 and the processing performed by storage device 100 in the modification example #2 are described. According to the modification example #2, since the iSW interprets the content of the test frame according to a SAS protocol, it can contribute to a reduction in circuit scale or the like without the diagnosis circuit 121*b* being provided. Instead of returning the response to the CPU122*a* in S309, the mechanism may be modified in such a manner that the response to the test frame is returned to the PHY 122*f*, and then, the CPU 122*a* performs the diagnosis according to whether or not the response is received by the PHY 122*f*.

(Application Example: Application to Multistage Coupling)

Figure 11:
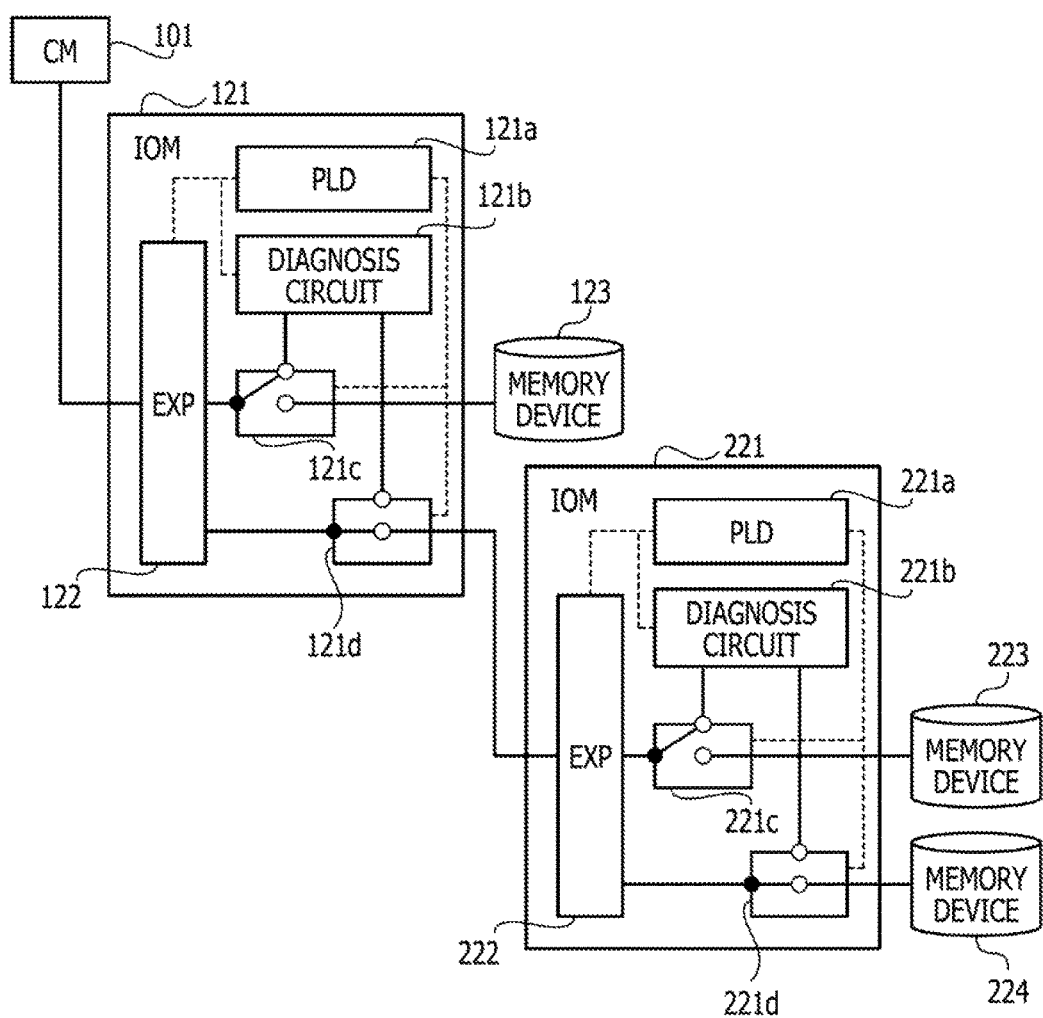
FIG. 11 is a diagram illustrating a multistage coupling form of an IOM as an application example in the second embodiment.

Up to now, for the convenience of description, an example of directly coupling the memory devices 123 and 124 to the EXP122 is described. However, the technology in the second embodiment can be applied to a cascade coupling system in which the DE is coupled in multistage. As an example of the application example, a multistage coupling form of an IOM is illustrated in FIG. 11. FIG. 11 is a diagram illustrating a multistage coupling form of the IOM as an application example in the second embodiment.

The example in FIG. 11 illustrates a cascade coupling system in which the IOM 221 instead of the memory device 124 is coupled to the EXP 122 of the IOM 121. The IOM 221 includes a PLD221*a*, a diagnosis circuit 221*b*, SWs 221*c* and 221*d*, and an EXP222. In addition, the PLD221*a*, the diagnosis circuit 221*b*, the SWs 221*c* and 221*d*, and the EXP222 respectively have functions same to those of the PLD121*a*, the diagnosis circuit 121*b*, the SWs 121*c* and 121*d*, and the EXP122. Memory devices 223 and 224 are coupled to the EXP222.

Figure 12:
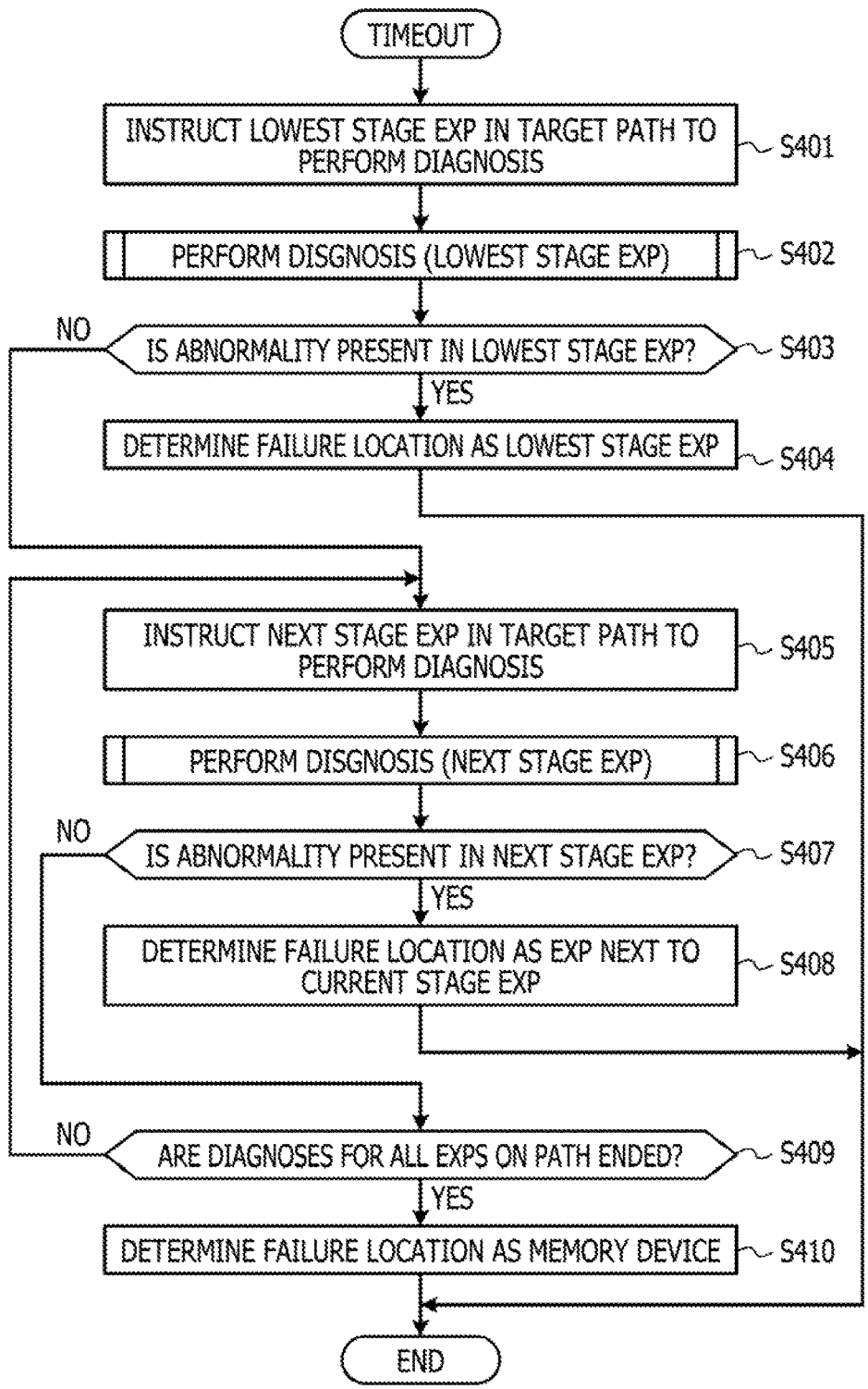
FIG. 12 is a sequence diagram illustrating a flow of failure location specification processing performed by the storage device in an application example in the second embodiment when a path abnormality occurs.

In a case of the system illustrated in FIG. 11, the failure location specification processing is as illustrated in FIG. 12. FIG. 12 is a sequence diagram illustrating a flow of failure location specification processing performed by the storage device in the application example in the second embodiment when a path abnormality occurs.

(S401, S402) When a timeout occurs, the IOC114 instructs the EXP (hereinafter, referred to as a lowest stage EXP: in this example, the EXP 222) which is in the lowest stage of the diagnosis target path (hereinafter, referred to as a target path) to perform the diagnosis (diagnosis instruction). The lowest stage EXP that received the diagnosis instruction performs the diagnosis (refer to S114 to S122 in FIG. 6).

(S403) The IOC 114 determines whether or not an abnormality is present in the lowest stage EXP (whether or not the failure location is the lowest stage EXP) based on the result of diagnosis received from the lowest stage EXP. In a case where the abnormality is present in the lowest stage EXP, the process proceeds to S404. On the other hand, in a case where the abnormality is not present in the lowest stage EXP, the process proceeds to S405.

(S404) The IOC 114 determines that the failure location is the lowest stage EXP (EXP222). When the processing in S404 is finished, a series of processing items illustrated in FIG. 12 ends.

(S405, S406) The IOC 114 instructs an EXP in the next stage of the target path (next stage EXP; in the example, the EXP122) to perform the diagnosis (diagnosis instruction). That is, the processing proceeds while moving the diagnosis target to the upper stage EXP one by one in an order from the lowest stage EXP coupled in cascade along the target path. The next stage EXP that received the diagnosis instruction performs the diagnosis (refer to S114 to S122 in FIG. 6).

(S407) The IOC 114 determines whether or not an abnormality is present in the next stage EXP (whether or not the failure location is the EXP next to the current stage EXP) based on the result of diagnosis received from the next stage EXP. In a case where the abnormality is present in the next stage EXP and the process proceeds to S408. On the other hand, in a case where the abnormality is not present in the next stage EXP, and the process proceeds to S409.

(S408) The IOC 114 determines that the failure location is the EXP next to the current stage EXP (EXP122). When the processing S408 is finished, a series of processing items illustrated in FIG. 12 ends.

(S409) The IOC 114 determines whether or not the diagnoses for all the EXPs on the path are ended. In a case where the diagnoses for all the EXPs on the target path are ended, the processing proceeds to S410. On the other hand, in a case where there exists an undiagnosed EXP, the processing proceeds to S405.

(S410) The IOC 114 determines that the failure location is a memory device (for example, the memory device 223) coupled to the lowest stage EXP (EXP222). When the processing in S410 is finished, a series of processing items illustrated in FIG. 12 ends.

As above, the application example to the cascade coupling system is described. The modification examples #1 and #2 described above can be applied to this application example. In this case, the switch in the system illustrated in FIG. 11 and the method of performing the diagnosis in FIG. 12 are mainly modified.

(Others: Application to Other Interfaces)

Up to now, for the convenience of description, the method of diagnosing the failure location in the SAS coupled transmission path is described. However, for example, the technology in the second embodiment can also be similarly applied to a transmission path in the coupling form defined in a protocol such as FC or NVMe. In this case, the diagnosis is performed using the test frame having a frame structure defined in the applied protocol. However, in any of the protocols, the interpretation of the frame structure and the reading the destination address are performed, and the processing items at the time transmission and the reception are performed according to the result of the interpretation and the reading. Therefore, the technology in the second embodiment and the modification example thereof can be applied to various protocols described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a first port; and
a processor coupled to the first port and configured to:
transmit, via the first port, a first signal to a first device coupled to the first port,
switch a coupling destination of the first port from the first device to a second device to determine whether a failure is present in the first port when the information processing device does not receive a first response signal in response to the first signal,
transmit, via the first port to the second device, a second signal indicating a first process, and
determine that the failure is present in the first device when the second device does not determine that the failure is present in the first port, by performing the first process.

2. The information processing device according to claim 1, wherein the first process is a process in which the second device transmits a second response signal in response to the second signal to the information processing device.

3. The information processing device according to claim 1, wherein the first signal is a frame for establishing a connection between the first device and the information processing device.

4. The information processing device according to claim 1, wherein
the first port is coupled to the first device via a first transmission path,
the second device is coupled to the first transmission path via a switching element, and
the processor is configured to switch the coupling destination of the first port to the second device from the first device by controlling the switching element when the information processing device does not receive the first response signal.

5. The information processing device according to claim 4, further comprising:
an error counter configured to count a number of errors occurring in the first transmission path,
wherein the processor is configured to cause the second device to determine whether the failure is present in the first port when a counted value by the error counter is less that a first value.

6. The information processing device according to claim 1,
further comprising a plurality of ports including the first port,
wherein the plurality of ports are respectively coupled to a plurality of devices including the first device, and the first port is selected from the plurality of ports based on a destination address of the first signal.

7. The information processing device according to claim 1, wherein the first port is an expansion device.

8. The information processing device according to claim 1, wherein the first device is a storage device.

9. A method of testing executed by an information processing device including a first port and a processor coupled to the first port, the method comprising:
transmitting, via the first port, a first signal to a first device coupled to the first port;
switching a coupling destination of the first port from the first device to a second device to determine whether a failure is present in the first port when the information processing device does not receive a first response signal in response to the first signal;
transmitting, via the first port to the second device, a second signal indicating a first process; and
determining that the failure is present in the first device when the second device does not determine that the failure is present in the first port, by performing the first process.

10. The method according to claim 9, wherein the first process is a process in which the second device transmits a second response signal in response to the second signal to the information processing device.

11. The method according to claim 9, wherein the first signal is a frame for establishing a connection between the first device and the information processing device.

12. The method according to claim 9, wherein
the first port is coupled to the first device via a first transmission path,
the second device is coupled to the first transmission path via a switching element, and
the switching of the coupling destination of the first port includes switching the coupling destination of the first port to the second device from the first device by controlling the switching element when the information processing device does not receive the first response signal.

13. The method according to claim 12, wherein
the information processing device further includes an error counter configured to count a number of errors occurring in the first transmission path, and
the method further comprises:
determining whether a value counted by the error counter is in a first range, and
when the value is in the first range, instructing the second device to determine whether the failure is present in the first port.

14. The method according to claim 9, wherein
the information processing device includes a plurality of ports including the first port,
the plurality of ports are respectively coupled to a plurality of devices including the first device, and
the method further comprises selecting the first port from the plurality of ports based on a destination address of the first signal.

15. The method according to claim 9, wherein the first port is an expansion device.

16. The method according to claim 9, wherein the first device is a storage device.

* * * * *